Sept. 11, 1956      O. E. WATSON      2,762,669
NESTING AND FOLDING SERVING CART
Filed March 22, 1954      2 Sheets-Sheet 1
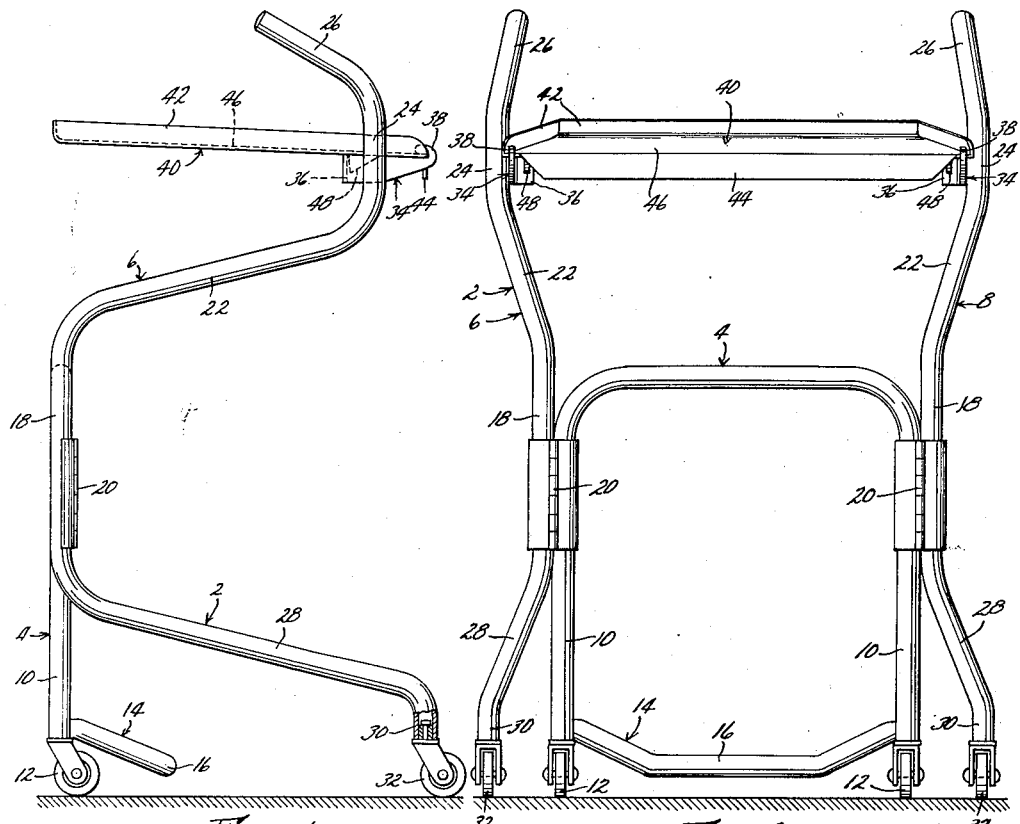
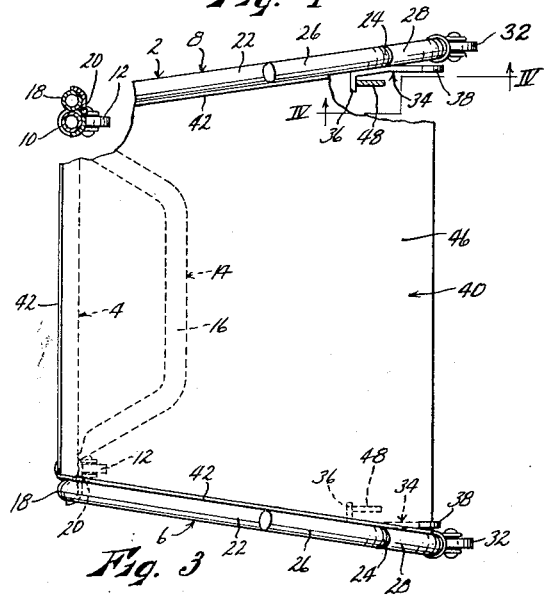
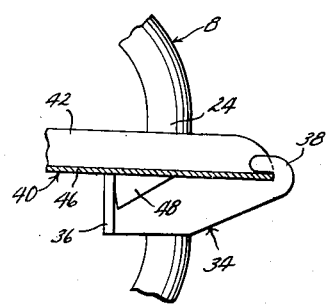
INVENTOR.
Orla E. Watson
BY
Hamilton & Hamilton
Attorneys.

Sept. 11, 1956   O. E. WATSON   2,762,669
NESTING AND FOLDING SERVING CART
Filed March 22, 1954   2 Sheets-Sheet 2
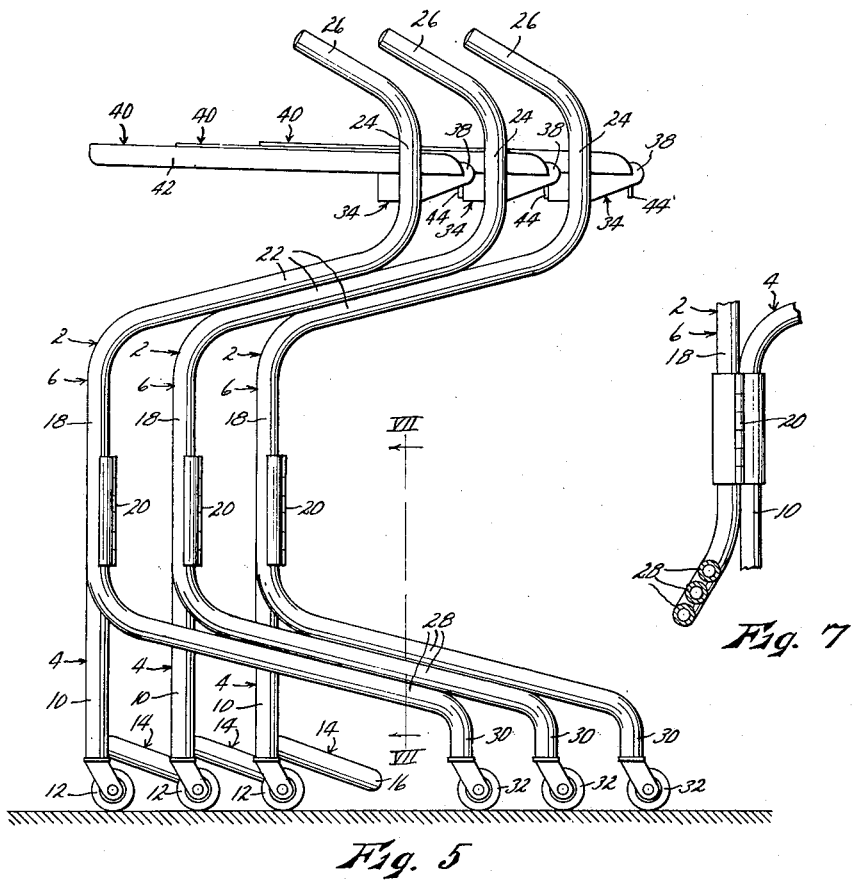
INVENTOR.
Orla E. Watson
BY Hamilton + Hamilton
Attorneys.

2,762,669

NESTING AND FOLDING SERVING CART

Orla E. Watson, Kansas City, Kans.

Application March 22, 1954, Serial No. 417,558

12 Claims. (Cl. 311—17)

This invention relates to new and useful improvements in carts, and has particular reference to a cart suitable for serving meals and the like in homes, cafeterias, etc., although it will be apparent that the usage of the device is not so limited.

The principal object of the present invention is the provision of a serving cart which may be telescoped or nested within other identical carts, so as to occupy a minimum of floor space when not in use.

Another object is the provision of a nesting or telescoping cart of the character described which is also adapted to be folded so as to occupy a relatively quite small space, particularly for convenience and economy in shipping and storage.

A further object is the provision of a cart of the character described wherein the supporting frame or body is so disposed as to straddle or extend beneath the chair or bench on which a person sits as he eats from the tray portion, so that said tray portion may be pulled as close as desired to the chair, or may actually extend over the chair.

A still further object is the provision of a cart of the character described in which the supporting frame is so constructed that the tray portion of the cart may be overlapped over the top of a table, bed, or the like if desired.

Other objects are simplicity and economy of construction, ease and convenience of operation, and adaptability for a wide variety of usages.

With these objects in view, as well as other objects which will appear in the course of the specification, reference will be had to the drawing, wherein:

Fig. 1 is a side elevational view, partially broken away, of a serving cart embodying the present invention.

Fig. 2 is a rear elevational view of the cart shown in Fig. 1.

Fig. 3 is a top plan view, partially broken away, of the cart shown in Fig. 1.

Fig. 4 is an enlarged fragmentary sectional view taken on line IV—IV of Fig. 3.

Fig. 5 is a side elevational view of a plurality of the carts, shown in nested or telescoped relation.

Fig. 6 is a top plan view of the body portion of one of the carts, shown in folded position.

Fig. 7 is a fragmentary sectional view taken on line VII—VII of Fig. 5.

Like reference numerals apply to similar parts throughout the several views, and the numeral 2 applies to the cart body portion, said body comprising a front frame 4 and a pair of side frames 6 and 8. The front frame 4 comprises a length of tubular metal bent into substantially inverted U-form and disposed in a vertical plane transversely of the cart, at the forward edge thereof. The parallel legs 10 thereof each have a floor-engaging caster wheel 12 mounted at the lower end thereof. A foot rest 14 is carried by frame 4, and comprises a length of tubular stock bent into substantial U-form with the forwardly divergent arms thereof respectively welded or otherwise fixed to the lower ends of legs 10. The foot rest slopes rearwardly and downwardly from legs 10, and the connecting portion 16 thereof extends horizontally above the floor.

The side frames 6 and 8 are substantially identical, each comprising a length of tubular metal bent into a planar form best shown in Fig. 1. It includes a vertically disposed upright portion 18 disposed parallel to and closely adjacent one of legs 10 of the front frame, and pivotally connected to said leg by means of a vertical hinge 20. At the upper end of upright 18, the frame tube is bent to form, successively, an upwardly and rearwardly inclined section 22, a vertical section 24, and an upwardly and forwardly inclined handle section 26. At the lower end of upright 18, the frame tube is bent to form, successively, a downwardly and rearwardly inclined section 28, and a vertical section 30, to the lower end of which is attached a floor-engaging caster wheel 32. Frames 6 and 8 are attached respectively to the two legs 10 of front frame 4, and as best shown in Fig. 3, normally diverge outwardly and rearwardly therefrom. The hinges 20 are so disposed as to prevent the side frames from pivoting any further outwardly than shown in Fig. 3, the uprights 18 of said side frames abutting against legs 10 in this position.

A supporting plate 34 is welded or otherwise rigidly fixed to the inner surface of vertical portion 24 of each side frame, said plate being disposed generally in a vertical plane. The front end portion of said plate is bent inwardly to form a stop 36, and the rearward end of said plate is formed to present a forwardly opening hook 38. Said supporting plates carry a tray 40. Said tray is formed preferably of sheet metal such as stainless steel, having an upturned lip 42 along the front and side edges thereof, and a downwardly turned lip 44 along the rearward edge thereof, and its side edges converge inwardly and forwardly so as to lie substantially in the same vertical planes as side frames 6 and 8. The rear edge portion of the floor 46 of the tray engages releasably in hooks 38, and said floor is supported on the upper edges of plates 34. In order to prevent the tray from sliding forwardly, thereby becoming disengaged from hooks 38, a lug 48 is welded or otherwise fixed to the lower surface of tray floor 46 adjacent each of the rearward corners thereof. Each of said lugs is so positioned that it engages the rearward face of the associated stop 36, as best shown in Fig. 4.

The tray is assembled in the body by inserting the rearward edge of the tray in hooks 38 with the forward edge of the tray tilted upwardly. The forward edge of the tray is then lowered to engage lugs 48 behind stops 36. It will be noted also that in the assembled position hooks 38 engage the inner surfaces of the side lips 42 of the tray. The tray thus serves as a lock preventing any further spreading of the rear edges of side frames 6 and 8. The upper edges of plates 34 are so inclined that the tray floor 46 slopes slightly upwardly to the front, as shown. Although exaggerated somewhat in the drawing for purposes of clarity, this slope is not sufficiently great to interfere with the use thereof as a serving tray.

In use, the handles 26 serve as a convenient means for manually propelling and guiding the cart, and also for lifting the cart over such minor obstructions as might exist on the floor over which the cart is to be propelled. When the user is seated with the tray before him, he places his feet on the foot rests 14 to prevent accidental movement of the cart. The transverse spacing between the rear leg portions 28—30 of the side frames is sufficiently great that they will pass on the opposite sides of or "straddle" an ordinary chair, so that the user may pull the tray as close to himself as desired. Also, the leg portions 28 are sufficiently low that they may be extended beneath any chair or bench on which the user may be seated. It will be noted also that the forward portion of the tray may be extended over the top of a table, hospital bed, or the like, the portions 22 of the side frames being spaced sufficiently far below the tray to pass beneath the table or bed.

Fig. 5 shows three of the carts nested or telescoped within each other whereby they occupy a minimum of floor space. To nest the carts, one cart is simply pushed forwardly into the rearward side of another cart, the front frame 4 of the rearward cart thereby entering and passing forwardly between leg portions 28 of the side frames 6 and 8 of the forward cart, and tray 40 of the rearward cart extending into and above the tray of the forward cart. The telescoping movement of the carts is arrested when the forward faces of stops 36 of the rearward cart strike the rearward surface of the tray lip 44 of the forward cart. This occurs while the tapering parts 22 and 28 of the side frames of the respective carts are still out of contact. This prevents any possibility of jamming or binding between said tapering parts, and thereby insures that the carts may be separated easily. The apparent contact between portions 22 and 28 in Fig. 5 is not actual, as shown in Fig. 7.

Fig. 6 shows the body portion of one of the carts folded for convenience of storage and shipping. To perform this operation, the tray is first removed by tilting the forward edge thereof upwardly to disengage lugs 48 from stops 36, then pulling the tray forwardly to disengage it from hooks 38, and then pivoting side frames 6 and 8 inwardly on hinges 20 to lie approximately parallel to and against front frame 4. The tray and body may then be laid together, and may be packed or stored in a small space.

While I have shown and described a specific embodiment of my invention, it is readily apparent that many minor changes of structure and operation could be made without departing from the spirit of the invention as defined by the scope of the appended claims.

What I claim as new and desire to protect by Letters Patent is:

1. A serving cart comprising a substantially planar front frame disposed in a vertical plane transversely of the cart, a pair of substantially planar side frames attached at their forward edges respectively to the opposite sides of said front frame and extending rearwardly therefrom in divergent relationship, each of said side frames comprising an elongated member formed to present an intermediate upright portion secured to said front frame, a lower portion extending rearwardly from the lower end of said upright portion and an upper portion extending rearwardly from the upper end of said upright portion, and a forwardly tapering, upwardly inclined tray secured adjacent its rearward edge between said upper frame portions and extending forwardly in spaced apart relation above said upper side frame portions, whereby the forward end of said cart may be telescoped within another like cart via the rearward end thereof, said lower rearwardly extending side frame portions being disposed lower than the average seat level of chairs and said upper rearwardly extending side frame portions being disposed above said average seat level but lower than average table height.

2. The structure as set forth in claim 1 having ground-engaging wheels secured to the lower end of said front frame and to the rearward ends of said lower side frame portions.

3. The structure as set forth in claim 1 having ground-engaging wheels secured to and supporting said front frame and each of said side frames, and having a foot rest fixed to said front frame, said foot rest including a bar extending parallel to and spaced above the floor and supported by members fixed to said front frame and being inclined downwardly and rearwardly therefrom.

4. The structure as set forth in claim 1 wherein said upper side frame portions are inclined upwardly and rearwardly, and said lower side frame portions are inclined downwardly and rearwardly, whereby the distance said cart may be telescoped within another like cart is increased without necessity of increasing the angle of divergence between said side frames.

5. A serving cart comprising a substantially planar front frame having the form of an inverted U, said front frame being disposed in a vertical plane transversely of the cart, a wheel mounted at the lower end of each leg of said front frame, a pair of substantially planar side frames secured at their forward edges respectively to the opposite legs of said front frame and extending rearwardly from said front frame in divergent vertical planes, each of said side frames comprising an elongated member formed to present a front upright portion secured to said front frame and extending above said front frame, a rearwardly and downwardly inclined lower portion extending from the lower end of said front upright portion, an upwardly and rearwardly inclined upper portion extending from the upper end of said front upright portion, and a rear upright extending upwardly from the rearward end of said upper frame portion, a wheel mounted at the rearward end of each of said lower side frame portions, and a forwardly tapering tray secured adjacent its rearward edge between the rear uprights of said side frames and extending forwardly therefrom in upwardly inclined relation, said lower rearwardly extending side frame portions being disposed lower than the average seat level of chairs and said upper rearwardly extending side frame portions being disposed above said average seat level but lower than average table height.

6. The structure as set forth in claim 5 having a foot rest affixed to said front frame, said foot rest comprising an elongated member having a central horizontal portion extending transversely of the cart in rearwardly spaced relation from said front frame, and upwardly, outwardly and forwardly inclined end portions fixed at their forward ends respectively to the lower ends of the legs of said front frame.

7. A serving cart comprising a substantially planar front frame disposed in a vertical plane transversely of the cart, a pair of substantially planar side frames hingedly connected at their forward vertical edges respectively to the opposite vertical edges of said front frame, whereby said side frames may be folded against said front frame, said side frames normally extending rearwardly and divergently from said front frame in vertical planes, each of said side frames comprising an elongated member formed to present a front upright portion which is the portion hinged to said front frame, a lower portion extending rearwardly from the lower end of said upright portion, an upper portion extending rearwardly from the upper end of said upright portion, and a rear upright extending upwardly from the rearward end of said upper portion, and a forwardly tapering tray removably secured adjacent its rearward edge between the rear uprights of said side frames, and extending forwardly from said rear uprights with an upward inclination, said lower rearwardly extending side frame portions being disposed lower than the average seat level of chairs and said upper rearwardly extending side frame portions being disposed above said average seat level but lower than average table height.

8. The structure as set forth in claim 7 wherein the said upper side frame portions are inclined upwardly to the rear, and said lower side frame portions are inclined downwardly to the rear.

9. The structure as set forth in claim 7 having stop means whereby the hinging movement of said side frames relative to said front frame is limited so that said side frames cannot be pivoted outwardly from their normal rearwardly divergent relationship, and wherein said tray engages said rear uprights to prevent said side frames from pivoting inwardly.

10. The structure as set forth in claim 7 having stop means whereby the hinking movement of said side frames relative to said front frame is limited so that said side frames cannot be pivoted outwardly from their normal rearwardly divergent relationship, and wherein said tray engages said rear uprights to prevent said side frames from pivoting inwardly, and having members fixed to said uprights and interlocking with said tray whereby to secure said rear uprights against movement away from each other.

11. The structure as set forth in claim 7 wherein a pair of support members are secured respectively to the confronting sides of said rear uprights and extending forwardly and rearwardly from said uprights, each of said support members having a planar upper surface for supporting said tray, a forwardly opening hook at the rearward end thereof, and an inturned stop at the forward end thereof, the rearward edge of said tray being engaged in said hooks, and a pair of lugs fixed to the lower surface of said tray and respectively engaging the rearward surfaces of said stops.

12. The structure as set forth in claim 7 wherein a pair of support members are secured respectively to the confronting sides of said rear uprights and extend forwardly and rearwardly from each of said uprights, each of said support members having a planar upper surface for supporting said tray, a forwardly opening hook at the rearward end thereof, and an inturned stop at the forward end thereof, the rearward edge of said tray being engaged in said hooks, and a pair of lugs fixed to the lower surface of said tray and respectively engaging the rearward surfaces of said stops, and wherein said tray is provided with upturned lips along the side edges thereof, said hooks being disposed immediately adjacent and in engagement with said tray lips.

References Cited in the file of this patent

UNITED STATES PATENTS

| | | |
|---|---|---|
| 1,986,078 | Spang | Jan. 1, 1935 |
| 2,134,638 | Lundstrom et al. | Oct. 25, 1938 |
| 2,183,410 | Scriven | Dec. 12, 1939 |
| 2,315,595 | Chappory | Apr. 6, 1943 |
| 2,479,530 | Watson | Aug. 16, 1949 |
| 2,555,722 | Wilkie | June 5, 1951 |
| 2,556,532 | Goldman | June 12, 1951 |
| 2,673,671 | Williams | Mar. 30, 1954 |